United States Patent
Ankaiah et al.

(10) Patent No.: US 10,432,636 B2
(45) Date of Patent: Oct. 1, 2019

(54) SECURING MDNS IN ENTERPRISE NETWORKS

(71) Applicant: Extreme Networks, Inc., San Jose, CA (US)

(72) Inventors: Shashi Hosakere Ankaiah, Bangalore (IN); Vivek L Atreya, Bangalore (IN); Seemant Choudhary, Fremont, CA (US); Uday Shankar, Bangalore (IN)

(73) Assignee: Extreme Networks, Inc., San Jose, CA (US)

( * ) Notice: Subject to any disclaimer, the term of this patent is extended or adjusted under 35 U.S.C. 154(b) by 1136 days.

(21) Appl. No.: 14/097,232

(22) Filed: Dec. 4, 2013

(65) Prior Publication Data

US 2015/0156630 A1    Jun. 4, 2015

(51) Int. Cl.
G06Q 30/00    (2012.01)
H04L 29/06    (2006.01)

(52) U.S. Cl.
CPC ............ H04L 63/101 (2013.01); H04L 63/08 (2013.01)

(58) Field of Classification Search
CPC .............................. H04L 63/101; H04L 63/08
USPC ......................................................... 705/50
See application file for complete search history.

(56) References Cited

U.S. PATENT DOCUMENTS

| | | | | |
|---|---|---|---|---|
| 8,543,471 B2* | 9/2013 | Salowey | ............. | H04L 63/0823 705/18 |
| 8,830,866 B2* | 9/2014 | Bradley | ................ | H04W 48/16 370/254 |
| 9,369,473 B2* | 6/2016 | Janakiraman | ......... | H04L 63/101 |
| 10,091,065 B1* | 10/2018 | Gast | ........................ | H04L 41/12 |

OTHER PUBLICATIONS

Britannica Concise Encyclopedia, Encyclopedia Britannica, 2006, p. 537.*
Explaining Creativity, Keith Sawyer, 2006, Oxford University Press, pp. 104-105.*
The Way We Think, Fauconnier, 2010, Persues Books Group, Chapter 1, Chapter 13.*
Creativity and Artificial Intelligence, Francisco Camara Pereira, Mouton de Gruyter, 2007, pp. 51-62.*
Islands of Genius, Treffert, 2010, Jessica Kingsley Publishing, pp. 120-129, 161-164.*
Rigorous Mathematical Thinking, Kinard, Kozulin, 2008, Cambridge University Press, pp. 19-22.*
Symbols and Meanings in school mathematics, Pimm, 1995, Routledge, pp. 80-87.*
Engaging Imagination and Developing Creativity in Education, Egan, Madej, 2015, Cambridge Scholars Publishing, pp. 70-71.*
Cognition—From Memory to Creativity, Weisberg, Reeves, 2013, John Wiley & Sons, pp. 13-40, 519-527.*

(Continued)

*Primary Examiner* — Matthew T Sittner
*Assistant Examiner* — Michael I Ezewoko
(74) *Attorney, Agent, or Firm* — Sterne, Kessler, Goldstein & Fox P.L.L.C.

(57) ABSTRACT

Methods, systems and computer readable media for securing mDNS in enterprise networks are described. In some implementations, the method can include authorizing one or more service advertisements and validating one or more service advertisements. The method can also include adding one or more information details to a record associated with an advertised service.

17 Claims, 6 Drawing Sheets

(56) References Cited

OTHER PUBLICATIONS

Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Mental Spaces, Gilles Fauconnier, Cambridge University Press, 1998, pp. xxviii-xxix.*
Streetlights and Shadows, MIT Press, 2009, pp. 33-47.*
The future of the internet—and how to stop It, Yale University Press, 2008, Chapter(s) 1-9, [emphasis pp. 11-18].*
Computing The Mind, Oxford University Press, Edelman, 2008, pp. xi-36.*
Algorithms +Data Structures = Programs, 1976, pp. xii-55.*
Metaphors We Live by, Lakoff, University of Chicago Press, 1980, pp. ix-55.*
Frame Analysis, Goffman, Northeastern University Press, 1974, pp. 1-39, 301-344.*
Inside BlueTooth Low Energy, Artech House, Gupta, 2013, pp. 119-130.*
IT Convergence and Services, Springer, Park, 2012, pp. 439-442.*

* cited by examiner

SECURING MDNS IN ENTERPRISE NETWORKS

TECHNICAL FIELD

Embodiments relate generally to computer networks, and more particularly, to methods, systems and computer readable media for securing mDNS in enterprise networks.

BACKGROUND

Zero configuration networking (or zeroconf) is a group of technologies that can include service discovery, address assignment, and hostname resolution. Apple Computer Corporation's Bonjour zero configuration networking technology locates devices such as printers, other computers, and the services that those devices offer on a local network using multicast Domain Name System (mDNS) service records.

The mDNS service, which Bonjour is built on, may be suitable for small, single networks, but may not be suited for larger enterprises having multiple networks. Services send advertisements within a multicast domain and clients build a list of available services by listening to the advertisements. By monitoring Bonjour (or other zeroconf) advertisements, client devices can learn the location (e.g., IP address and port) of any service and then connect with one or more of those services as with any other service.

mDNS permits clients to publish their services to other clients by sending out DNS-SD records over a multicast protocol. The usage of link local multicast can restrict the publishing of services to a single network. However, some WLAN vendors may extend this capability to span across networks. While the use of zeroconf permits clients to discover printers, displays and other services without any configuration, it may also expose clients and networks to spoofing attacks.

Embodiments were conceived in light of the above mentioned needs, problems and/or limitations, among other things.

SUMMARY

One or more embodiments can include methods, systems and computer readable media for securing mDNS in enterprise networks. In some implementations, the method can include authorizing one or more service advertisements and validating one or more service advertisements. The method can also include adding one or more information details to a record associated with an advertised service.

The service advertisements can include a multicast domain name server service discovery message. Authorizing one or more service advertisements can include generating an allow/deny list of services for each user in a network and retrieving the allow/deny list for a client based on user authentication. The method can further include storing the allow/deny list with an authentication context for the client and distributing the authentication context to access points and wireless switching planes within the network. The method can also include monitoring service advertisements records in requests and responses, and comparing service advertisement records against the allow/deny list. The method can further include permitting any allowed service advertisements to be available to the client and removing any service advertisements associated with a deny entry in the allow/deny list.

Validating one or more service advertisements can include configuring a server with valid service records for one or more known services, and starting a service advertisement monitoring agent on a wireless network component. The method can also include validating a service advertisement from the wireless network component by sending a request to the server and receiving a response, permitting the service advertisement to be available to a client when the response indicates an authorized service and denying the service advertisement from reaching the client when the response indicates to deny the service advertisement.

The method can also include configuring the service advertisement monitoring agent to cache responses from the server so as to speed up processing of service advertisements. The method can further include configuring the service advertisement monitoring agent to validate one or more services according to a list of services to validate.

Adding one or more information details to a record associated with an advertised service can include adding user details to a service advertisement record, wherein the user details include authentication information about the user publishing the service. The method can also include displaying the user details at a client.

Adding user details to a service advertisement record can include adding user details to a TXT record of a domain name server service discovery message. The method can further include creating a TXT record for a service advertisement that does not have a TXT record.

Some implementations can include a system comprising one or more processors configured to perform operations. The operations can include authorizing one or more service advertisements. The operations can also include validating one or more service advertisements. The operations can further include adding one or more information details to a record associated with an advertised service.

Authorizing one or more service advertisements can include generating an allow/deny list of services for each user in a network, and retrieving the allow/deny list for a client based on user authentication. The operations can also include storing the allow/deny list with an authentication context for the client, and distributing the authentication context to access points and wireless switching planes within the network. The operations can further include monitoring service advertisements records in requests and responses, and comparing service advertisement records against the allow/deny list. The operations can also include permitting any allowed service advertisements to be available to the client and removing any service advertisements associated with a deny entry in the allow/deny list.

Validating one or more service advertisements can include configuring a server with valid service records for one or more known services, and starting a service advertisement monitoring agent on a wireless network component. The operations can also include validating a service advertisement from the wireless network component by sending a request to the server and receiving a response, permitting the service advertisement to be available to a client when the response indicates an authorized service and denying the service advertisement from reaching the client when the response indicates to deny the service advertisement.

Adding one or more information details to a record associated with an advertised service can include adding user details to a service advertisement record, wherein the user details include authentication information about the user publishing the service, and displaying the user details at a client.

Some implementations can include a nontransitory computer readable medium having stored thereon software instructions that, when executed by a processor, cause the processor to perform operations. The operations can include authorizing one or more service advertisements. The operations can also include validating one or more service advertisements. The operations can further include adding one or more information details to a record associated with an advertised service.

Authorizing one or more service advertisements can include generating an allow/deny list of services for each user in a network, and retrieving the allow/deny list for a client based on user authentication. The operations can also include storing the allow/deny list with an authentication context for the client, and distributing the authentication context to access points and wireless switching planes within the network. The operations can further include monitoring service advertisements records in requests and responses, and comparing service advertisement records against the allow/deny list. The operations can also include permitting any allowed service advertisements to be available to the client and removing any service advertisements associated with a deny entry in the allow/deny list.

Validating one or more service advertisements can include configuring a server with valid service records for one or more known services, and starting a service advertisement monitoring agent on a wireless network component. The operations can also include validating a service advertisement from the wireless network component by sending a request to the server and receiving a response, permitting the service advertisement to be available to a client when the response indicates an authorized service and denying the service advertisement from reaching the client when the response indicates to deny the service advertisement.

Adding one or more information details to a record associated with an advertised service can include adding user details to a service advertisement record, wherein the user details include authentication information about the user publishing the service, and displaying the user details at a client.

DETAILED DESCRIPTION

While some specific zero configuration network protocols, such as Apple's Bonjour, are discussed below to help illustrate various features, it will be appreciated that the systems, methods and computer readable media described herein can be configured to work with other zero configuration protocols or technologies. Also, some examples including multicast DNS-SD are discussed. However, it will be appreciated that implementations can be used with unicast DNS-SD as well.

Figure 1:
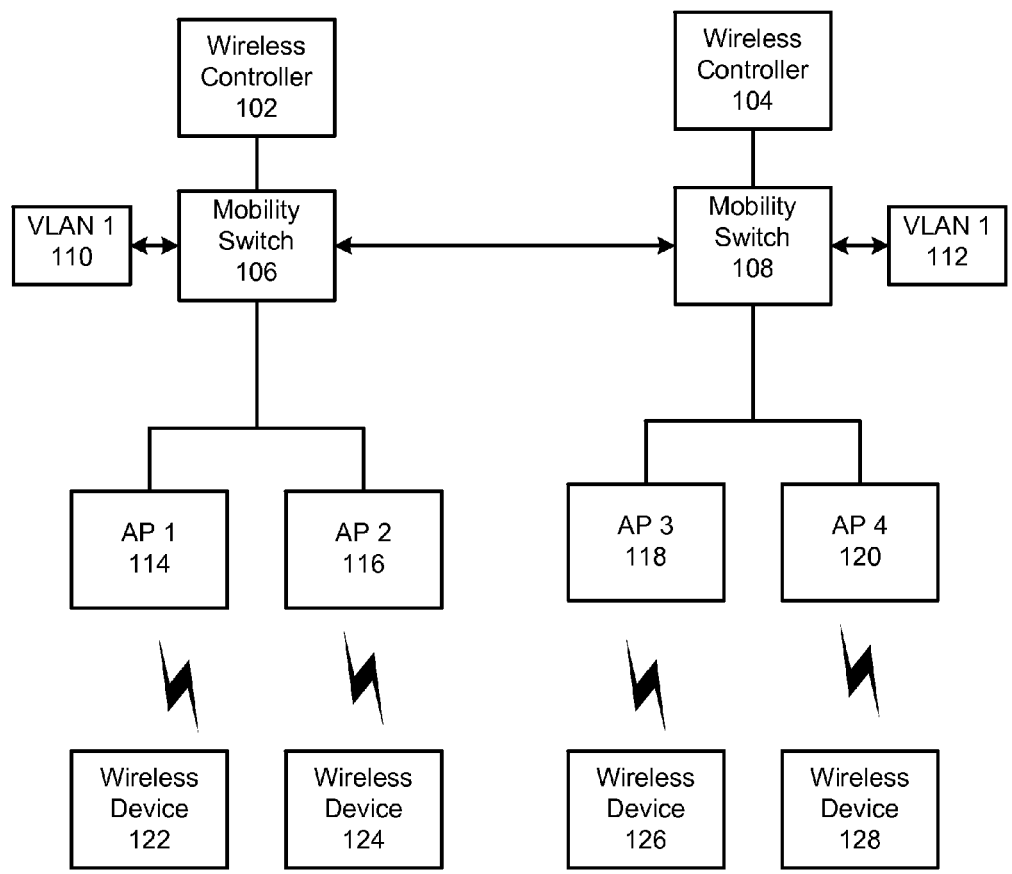
FIG. 1 is a diagram of an example network in accordance with at least one implementation.

As shown in FIG. 1, an example wireless network 100 (e.g., enterprise WLANs) includes wireless controllers (102 and 104) connected to respective mobility switches (or unified switches) 106 and 108. Each mobility switch (106 and 108) is connected to a respective VLAN (or MVLAN) 110, 112 and serves as the gateway for its corresponding VLAN (there can be more than one mobility switch or unified switch in each VLAN, but only one per VLAN will be designated as the gateway). Access points 114-120 are connected to corresponding unified switches 106, 108. Client devices 122-128 connect to the network via one of the access points 114-120.

In operation, the mobility switches (106 and 108) can receive authorized service and validated service information from an admin or other system (e.g., from a corresponding wireless controller 102/104) based on a user defined set of authorized services. A Bonjour (e.g., zeroconf) service advertisement can be sent from a client device (e.g., 128) to the mobility switch 108 via AP 4 120. Mobility switch 108 can sync service records with mobility switch 106, which caches (or stores) the services advertised by mobility switch 108. Spoofing attacks (or other types of attacks) can be reduced or eliminated using one or more of authorizing service advertisements, validating service advertisements and adding user details to service advertisement TXT records at the AP, WSP and/or wireless controller levels. These techniques are discussed in greater detail below.

A client device (e.g., 122) sends a service discovery request (e.g., via mDNS) to mobility switch 106 via AP 1 114. The mobility switch 106 sends a response framed as an mDNS response.

Figure 2:
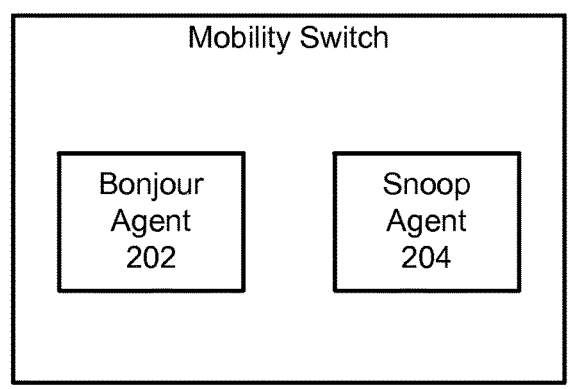
FIG. 2 is a diagram of an example unified switch (or mobility switch, or access point) in accordance with at least one implementation.

As shown in FIG. 2, a mobility switch (e.g., 106 and/or 108) can include a Bonjour agent 202 and a service advertisement snoop agent 204. The Bonjour agent 202 is discussed for illustration purposes and can be an agent for any zeronconf protocol.

The service advertisement snoop agent 204 can detect service advertisement messages and look into the details of those messages. The snoop agent 204 can determine whether a service advertisements message is authorized and also validate a service advertisement message. Further, the snoop agent can append user details (e.g., a portion of authentication information such as user ID) to a service advertisement message. The bonjour agents (e.g., 202) handle the relaying of the selected services across the network.

Figure 3:
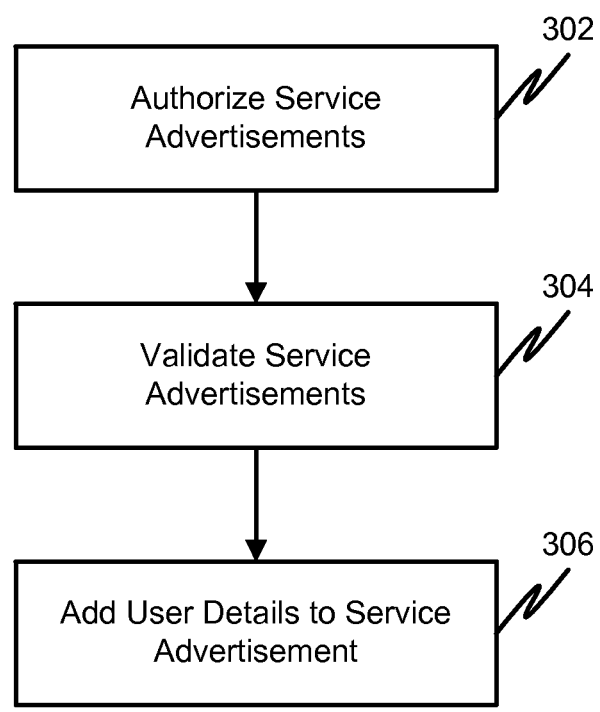
FIG. 3 is a flow chart of an example method for securing mDNS in enterprise networks in accordance with at least one implementation.

FIG. 3 is a flow chart of an example method for securing mDNS in enterprise networks in accordance with at least one implementation. Processing begins at 302, where service advertisements are authorized. Authorizing service advertisements is discussed in greater detail below in connection with FIG. 4. Processing continues to 304.

At 304, service advertisements are validated. Validating service advertisement is discussed below in greater detail in connection with FIG. 5. Processing continues to 306.

At 306, user details are added to a service advertisement. For example, a DNS-SD message can include a TXT record to describe the service being advertised. The TXT record can be made up of key, value pairs that describe the service. An mDNS snoop agent (e.g., 204) running on an AP, WSP and/or wireless controller can look into the service advertisement records in mDNS requests and responses.

The snoop agent can add user details to the service records. For example, the user details can include details about the logged-in user publishing the service advertisement. The user details can come from an authentication context, for example. Also, if a TXT record is not present on a service advertisement, the snoop agent can create a TXT record and add it to that service advertisement. The TXT record can be displayed by client devices to show a user of the client device the details of the user that is advertising the service.

It will be appreciated that 302-306 can be performed individually or together in a group of two or more. Also, it will be appreciated that 302-306 can be performed in whole or in part in order to accomplish an mDNS security task.

Figure 4:
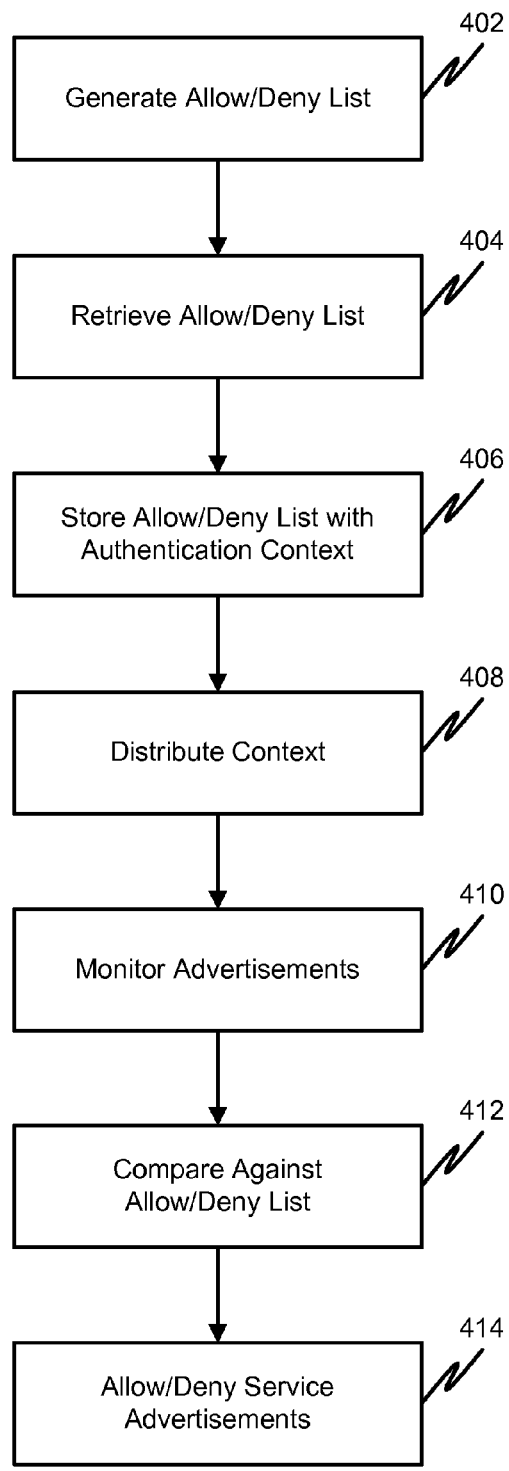
FIG. 4 is a flow chart of an example method for authorizing mDNS service advertisements in accordance with at least one implementation.

FIG. 4 is a flow chart of an example method for authorizing mDNS service advertisements in accordance with at least one implementation. Processing begins at 402, where an allow/deny list of mDNS services is created and/or maintained for each user of a network. The allow/deny list can specify the list of services that a user is allowed (or permitted) to access and a list of services that the user is deny (or prohibited) from accessing. The allow/deny list can be configured at an authentication server and can be conveyed to a wireless controller, AP or the like. Also, the allow/deny list can be configured on a user directory of an enterprise. Wireless controllers can also be configured to support local user databases and the allow/deny lists can be added to those local user databases. Processing continues to 404.

At 404, an mDNS service allow/deny list can be retrieved for a user following a successful authentication of the user (e.g., to a WLAN domain). For example, a wireless controller can retrieve the list from the user database. Processing continues to 406.

At 406, the allow/deny list can be stored as part of the user's context. Processing continues to 408.

At 408, the client context can be distributed to APs and WSPs in the network. Processing continues to 410.

At 410, the mDNS snoop agent (e.g., 204) running in an AP and/or WSP can look into service advertisements in mDNS requests and responses. Processing continues to 412.

At 412, the snoop agent can compare the advertisement records against the client allow/deny list. Processing continues to 414.

At 414, the snoop agent can allow (or permit) the service records that are authorized and remove (or deny) the service records that are not authorized. In this way, clients in the network only learn of authorized services.

It will be appreciated that 402-414 can be repeated in whole or in part.

Figure 5:
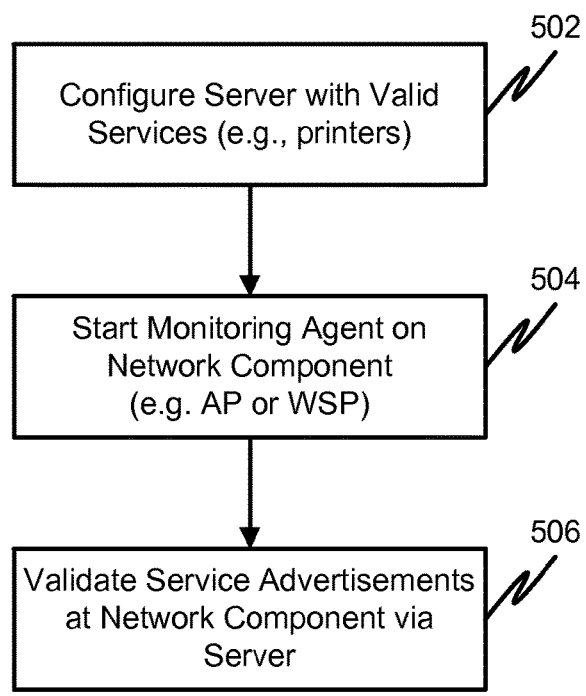
FIG. 5 is a flow chart of an example method for validating mDNS service advertisements in accordance with at least one implementation.

FIG. 5 is a flow chart of an example method for validating mDNS service advertisements in accordance with at least one implementation. Processing beings at 502, where a server (e.g., a DNS server in an enterprise) is configured with the valid DNS-SD records for known, critical, necessary or important services such as printers. Processing continues to 504.

At 504, a monitoring agent (or snoop agent) is started on an AP and/or WSP network component. The snoop agent can look into the services advertisement records in mDNS requests and responses. Processing continues to 506.

At 506, the snoop agent examines the service advertisement records in the mDNS packets and validates the service records by sending a request to the DNS server. Based on the response from the DNS server, the snoop agent can include/exclude the records from an outgoing packet. The snoop agent can cache responses from the DNS server in order to speed up processing. Also, the snoop agent can be configured to perform checking (or validation) on certain services (e.g., in a list of services to be validate). There can also be a list of services that are not validated.

It will be appreciated that 502-506 can be repeated in whole or in part.

Figure 6:
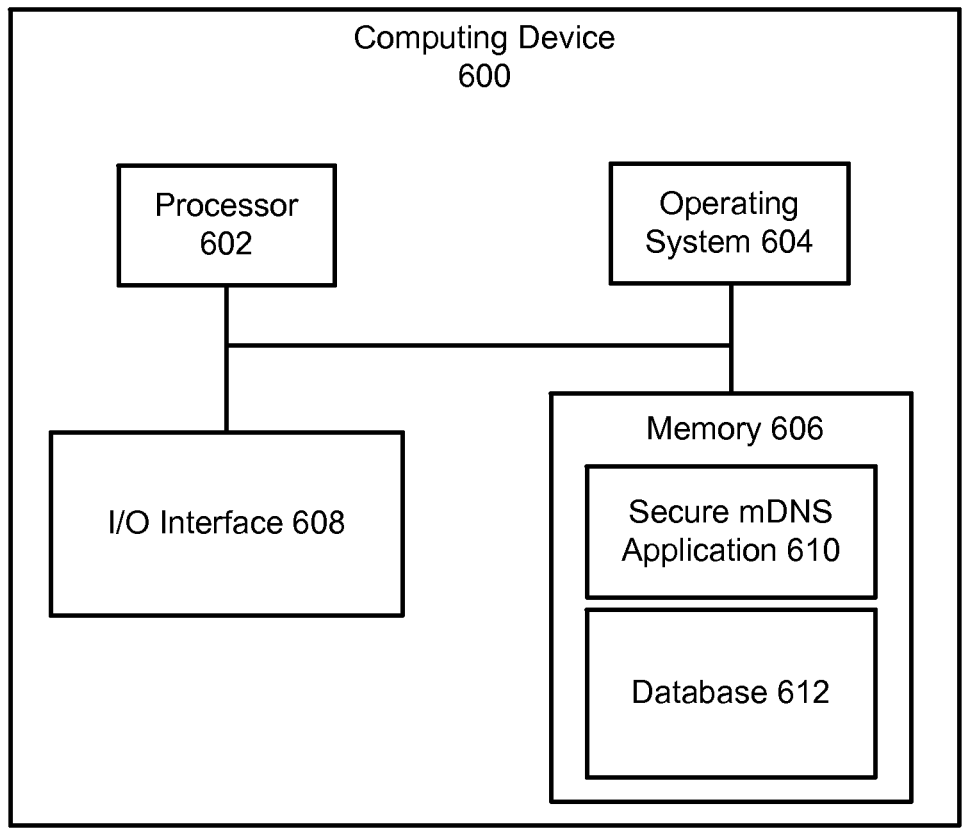
FIG. 6 is a diagram of an example computer system for mDNS support in unified access networks in accordance with at least one implementation.

FIG. 6 is a diagram of an example computer system 600 in accordance with at least one implementation. The computer 600 includes a processor 602, operating system 604, memory 606 and I/O interface 608. The memory 606 can include an application for securing mDNS in enterprise networks 610 and a database 612 (e.g., for storing authorized and/or validated services, allow/deny lists or the like).

In operation, the processor 602 may execute the application 610 stored in the memory 606. The application 610 can include software instructions that, when executed by the processor, cause the processor to perform operations for securing mDNS in enterprise networks in accordance with the present disclosure (e.g., performing one or more of steps 302-306, 402-414 and/or 502-506).

The application program 610 can operate in conjunction with the database 612 and the operating system 604.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for securing mDNS in enterprise networks.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A computer implemented method for securing a multicast domain name system in an enterprise network, the method comprising:
   receiving at a network device, multicast domain name system (mDNS) packets comprising one or more service advertisement records of a service; and
   in response to receiving the mDNS packets comprising the one or more service advertisement records of the service:
   transmitting, by the network device to a server with valid service records of known services, a request for an indication of whether the service is valid;
   in response to receiving, from the server, a response that indicates that the service is valid, validating, at the network device, the one or more service advertisement records by including the one or more service advertisement records in the mDNS packets;
   in response to receiving, from the server, a response that indicates that the service is not valid, excluding the one or more service advertisement records from the mDNS packets; and
   sending, by the network device, the mDNS packets to a client device.

2. The method of claim 1, further comprising:
   retrieving an allow/deny list associated with the client device in response to a successful authentication of the client device;
   storing the allow/deny list with an authentication context for the client device;
   distributing the authentication context to access points and wireless switching planes within the enterprise network;
   comparing the one or more service advertisement records against the allow/deny list;
   in response to the one or more service advertisement records being authorized, allowing the one or more service advertisement records in the mDNS packets; and
   in response to the one or more service advertisement records not being authorized, removing the one or more service advertisement records from the mDNS packets.

3. The method of claim 1, further comprising:
   caching, at the network device, the response from the server so as to speed up processing of the one or more service advertisement records.

4. The method of claim 1, further comprising:
   determining, by the network device, to validate the service in response to the service being on a first list of services to validate.

5. The method of claim 1, further comprising:
   adding user details to a mDNS service discovery message, wherein the user details include authentication information about publication of the service; and
   displaying the user details at the client device.

6. The method of claim 5, wherein the adding user details to the mDNS service discovery message includes adding the user details to a TXT record of the mDNS service discovery message.

7. The method of claim 5, further comprising creating a TXT record for a service advertisement that does not have a TXT record.

8. A system for securing a multicast domain name system in an enterprise network, the system comprising one or more processors configured to:
   receive multicast domain name system (mDNS) packets comprising one or more service advertisement records of a service; and
   in response to receiving the mDNS packets comprising the one or more service advertisement records of the service:
   transmit, to a server with valid service records of known services, a request for an indication of whether the service is valid;
   in response to receiving, from the server, a response that indicates that the service is valid, validate the one or more service advertisement records by including the one or more service advertisement records in the mDNS packets;
in response to receiving, from the server, a response that indicates that the service is not valid, exclude the one or more service advertisement records from the mDNS packets; and
send the mDNS packets to a client device.

9. The system of claim 8, wherein the one or more processors are further configured to:
retrieve an allow/deny list associated with the client device in response to a successful authentication of the client device;
store the allow/deny list with an authentication context for the client device;
distribute the authentication context to access points and wireless switching planes within the enterprise network;
compare the one or more service advertisement records against the allow/deny list;
in response to the one or more service advertisement records being authorized, allow the one or more service advertisement records in the mDNS packets; and
in response to the one or more service advertisement records not being authorized, remove the one or more service advertisement records from the mDNS packets.

10. The system of claim 8, wherein the one or more processors are further configured to:
add user details to a mDNS service discovery message, wherein the user details include authentication information about publication of the service; and
display the user details at the client device.

11. The system of claim 8, wherein the one or more processors are further configured to:
determine to validate the service in response to the service being on a first list of services to validate,
wherein the system stores the first list of services to validate and a second list of services not to validate.

12. A nontransitory computer readable medium having stored thereon software instructions that, when executed by a processor, cause the processor to perform operations including:
receiving multicast domain name system (mDNS) packets comprising one or more service advertisement records of a service; and
in response to receiving the mDNS packets comprising the one or more service advertisement records of the service and the service being on a list of services to be validated:
transmitting, to a server with valid service records of known services, a request for an indication of whether the service is valid;
in response to receiving, from the server, a response that indicates that the service is valid, validating the one or more service advertisement records by including the one or more service advertisement records in the mDNS packets;
in response to receiving, from the server, a response that indicates that the service is not valid, excluding the one or more service advertisement records from the mDNS packets; and
sending the mDNS packets to a client device.

13. The nontransitory computer readable medium of claim 12, wherein the operations further comprise:
retrieving an allow/deny list associated with the client device in response to a successful authentication of the client device;
storing the allow/deny list with an authentication context for the client device;
distributing the authentication context to access points and wireless switching planes within the network;
comparing the one or more service advertisement records against the allow/deny list;
in response to the one or more service advertisement records being authorized, including the one or more service advertisement records in the mDNS packets; and
in response to the one or more service advertisement records not being authorized, removing the one or more service advertisement records from the mDNS packets.

14. The nontransitory computer readable medium of claim 12, wherein the operations further comprise caching the response from the server so as to speed up processing of the one or more service advertisement records.

15. The nontransitory computer readable medium of claim 12, wherein the operations further comprise determining to validate the service in response to the service being on a first list of services to validate.

16. The nontransitory computer readable medium of claim 12, wherein the operations further comprise:
adding user details to a mDNS service discovery message, wherein the user details include authentication information about a user publishing the service; and
displaying the user details at the client device.

17. The nontransitory computer readable medium of claim 16, wherein the adding user details to the mDNS service discovery message includes adding the user details to a TXT record of the mDNS service discovery message.

\* \* \* \* \*